US011948767B1

(12) United States Patent
Retardo et al.

(10) Patent No.: US 11,948,767 B1
(45) Date of Patent: Apr. 2, 2024

(54) PROTECTION DEVICE WITH WALL VENT FOR BREAKING CAPACITY IMPROVEMENT

(71) Applicant: Littelfuse, Inc., Chicago, IL (US)

(72) Inventors: Roel Santos Retardo, Batangas (PH); Conrado Sagun De Leon, Manila (PH); Merjaycel Marquinez, Muntinlupa (PH)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 17/932,724

(22) Filed: Sep. 16, 2022

(51) Int. Cl.
*H01H 85/43* (2006.01)
*H01H 85/143* (2006.01)
*H01H 85/165* (2006.01)

(52) U.S. Cl.
CPC .......... *H01H 85/43* (2013.01); *H01H 85/143* (2013.01); *H01H 85/165* (2013.01)

(58) Field of Classification Search
CPC .. H01H 85/143; H01H 85/165; H01H 85/175; H01H 85/1755; H01H 85/43
See application file for complete search history.

(56) References Cited

U.S. PATENT DOCUMENTS

| | | | | |
|---|---|---|---|---|
| 2,915,609 A * | 12/1959 | Gordon | H01H 85/055 | 337/159 |
| 5,287,079 A * | 2/1994 | Bernardi | H01H 85/0417 | 337/250 |
| 6,542,063 B2 * | 4/2003 | Kawashima | H01H 85/0417 | 337/186 |
| 6,762,670 B1 * | 7/2004 | Yen | H01H 85/43 | 337/203 |
| 2010/0060406 A1 * | 3/2010 | Kim | H01H 85/147 | 337/187 |
| 2011/0279218 A1 * | 11/2011 | Salonga | H01H 85/055 | 337/187 |

* cited by examiner

*Primary Examiner* — Jacob R Crum
(74) *Attorney, Agent, or Firm* — KDW Firm PLLC

(57) ABSTRACT

Provided are circuit protection devices. In some embodiments, a protection device may include a set of leads extending though a socket body, wherein the socket body includes a first side opposite a second side, and a third side opposite a fourth side, wherein the third and fourth sides extend between the first and second sides, and wherein the third side includes a thermal vent. The protection device may further include a fusible element surrounding a central shaft, wherein the fusible element is connected with the set of leads.

20 Claims, 2 Drawing Sheets

PROTECTION DEVICE WITH WALL VENT FOR BREAKING CAPACITY IMPROVEMENT

FIELD OF THE DISCLOSURE

The disclosure relates generally to circuit protection devices and, more particularly, to circuit protection devices with one or more wall vents for breaking capacity improvement.

BACKGROUND OF THE DISCLOSURE

Fuses are typically used as circuit protection devices and form an electrical connection with a component in a circuit to be protected. The fuse is designed to protect the circuit or circuit component by being the intentional weak link in the circuit. One type of fuse includes a housing consisting of a plastic base and a plastic cap with a pair of conductors or terminals, which extend through the base and are connected via a fusible element that forms a bridge between the terminals inside the housing. To fix the terminals inside the base portion of the housing, a portion of each terminal and/or the base is deformed in order to pinch the base around the terminals, thereby clamping the base around the respective terminals. The fusible element is attached to ends of each of the two conductors projecting above the base. The fusible element is typically a conductive wire which is soldered to the ends of the two terminals. The fuse is placed in a circuit to be protected such that the fusible element melts when an abnormal overload condition occurs.

In certain circuit protection applications (e.g., motors, etc.), a surge current or short-term current overload situation may typically occur until a steady state condition for the device is achieved. Fuses employed in these types of circuits must be designed to permit this short-term surge to pass through the fuse without melting the fusible element. This high-surge condition is defined in terms of current and time (Pt) where it is desirable to avoid an open circuit unless the current exceeds a specific percentage of the fuse's rated current.

One type of fuse used in these applications employs a spiral wound fuse element. In particular, the fuse element comprises a core of twisted yarn fibers with a fuse wire or wound around the core in a spiral pattern. The yarn that comprises the core is typically a ceramic material that is void of any material that could become conductive when the fuse is blown. The wound wire may include a plurality of wire strands configured to provide increased heat absorption indicative of, for example, a slow-blow or time-delayed fuse.

When a circuit overload is encountered, the passage of the excess current through the fuse element causes it to generate heat and thereby elevate the temperature of the fuse wire. In other words, the core acts as a heat sink to draw this heat away from the fuse wire, thereby lowering the temperature of the fuse wire. In this manner, the transfer of heat from the fuse wire to the core lengthens the time required before the fuse wire melting temperature is reached. For higher current-rated fuses, a larger diameter fuse wire is used to withstand higher current passing through the wire and therefore higher temperatures. However, the wound fuse wire is limited in size, thereby limiting the amount of excess current the wire can withstand as well as the amount of heat transfer between the wound wire and the core.

Accordingly, there is a need for a fuse that utilizes a wound fusible wire element and a fuse employing the same configured to provide high I2t characteristics on the fuse element that will withstand high surge current and heat associated with inductive and capacitive loads to protect particular types of circuit components and associated circuits.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In some embodiments, a protection device may include a set of leads extending though a socket body, wherein the socket body includes a first side opposite a second side, and a third side opposite a fourth side, wherein the third and fourth sides extend between the first and second sides, and wherein the third side includes a thermal vent. The protection device may further include a fusible element surrounding a central shaft, wherein the fusible element is connected with the set of leads.

In some embodiments, a fusible device may include a set of leads extending though a socket body, wherein the socket body includes a first side opposite a second side, and a third side opposite a fourth side, wherein the third and fourth sides extend between the first and second sides, and wherein at least one of the third side and the fourth side includes a thermal vent. The fusible device may further include a fusible element wound about a central shaft, wherein the fusible element is electrically connected with the set of leads.

In some embodiments, a circuit protection device may include a set of leads extending though a socket body, wherein the socket body includes a first side opposite a second side, and a third side opposite a fourth side, wherein the third and fourth sides extend between the first and second sides, and wherein at least one of the third side and the fourth side includes a thermal vent. The circuit protection device may further include a fusible element wound about a central shaft, wherein the fusible element is electrically connected with the set of leads, and a housing surrounding the socket body, wherein the housing defines an internal cavity enclosing the fusible element.

BRIEF DESCRIPTION OF THE DRAWINGS

The accompanying drawings illustrate exemplary approaches of the disclosure, including the practical application of the principles thereof, and in which.

Figure 1:
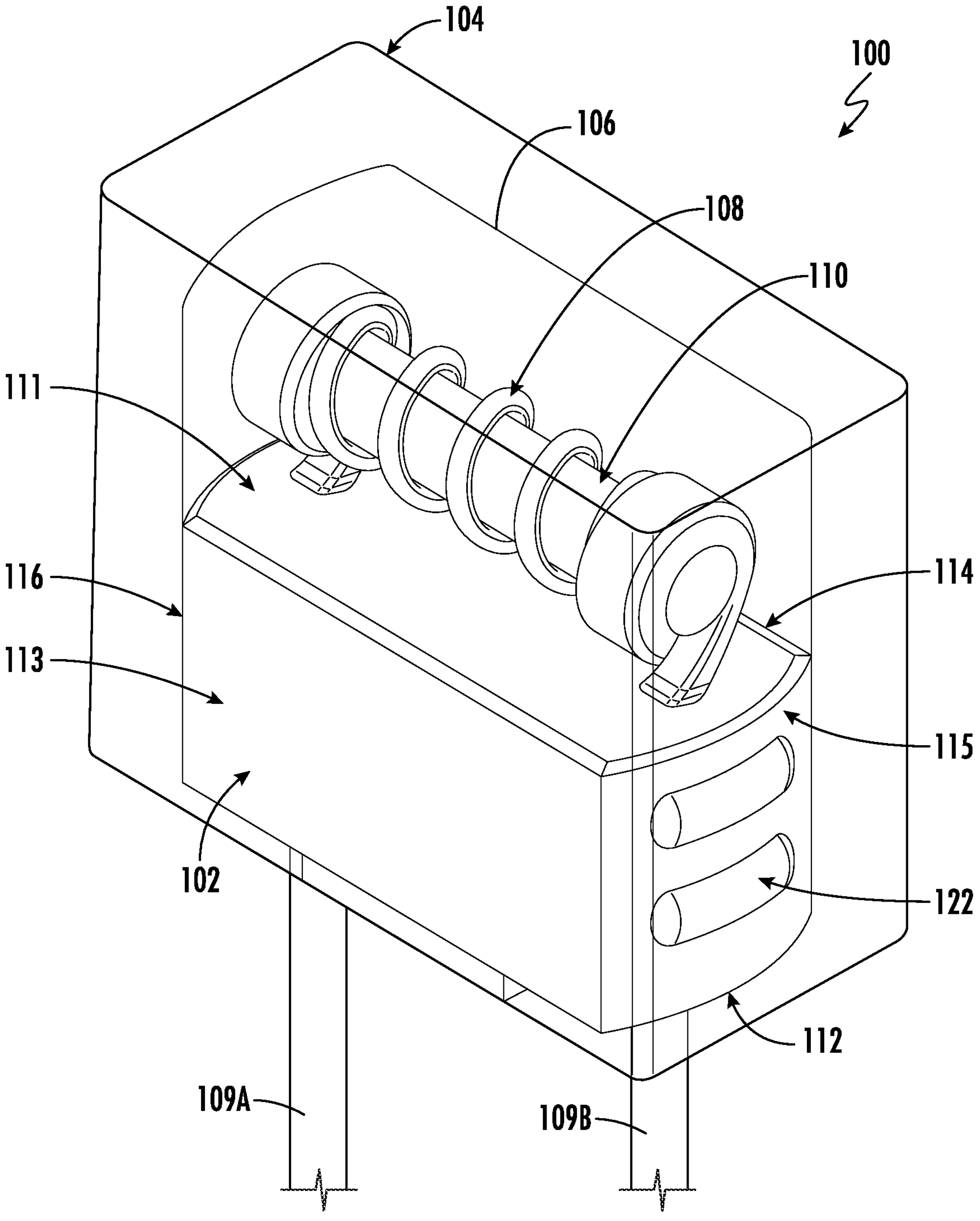
FIG. 1 is a perspective view of a protection device according to exemplary embodiments of the present disclosure.

The drawings are not necessarily to scale. The drawings are merely representations, not intended to portray specific parameters of the disclosure. The drawings are intended to depict typical embodiments of the disclosure, and therefore should not be considered as limiting in scope. In the drawings, like numbering represents like elements.

Furthermore, certain elements in some of the figures may be omitted, or illustrated not-to-scale, for illustrative clarity. Cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Fuse apparatuses and protection devices in accordance with the present disclosure will now be described more fully hereinafter with reference to the accompanying drawings, in which embodiments of the system and method are shown. The fuse apparatuses and protection devices, however, may be embodied in many different forms and should not be construed as being limited to the embodiments set forth herein. Rather, these embodiments are provided so that this disclosure will be thorough and complete, and will fully convey the scope of the system and method to those skilled in the art.

Embodiments of the present disclosure relate to circuit protection devices with one or more wall vents for breaking capacity improvement. Although non-limiting, devices described herein may be time-lag type subminiature fuses that are designed for overcurrent protection. As will be described in greater detail herein, the fuse body, or socket body, may have two larger ribs designed to ensues the fuse by cap is not blown off during SC. Conventional designs often include three smaller ribs, which provide inconsistent results and may not satisfy low-pull testing. Furthermore, embodiments of the present disclosure may provide a bigger/thicker fusible element yarn for low ratings and medium yarn high ratings, resulting in significant wire distance clearance/pitching to ensure high BC short circuit performance. Still furthermore, providing the wall venting feature(s) in the fuse body helps to eliminate multiple restrike and body rupture and melting issues, while also providing for breaking capacity improvement.

Referring to FIG. 1, an exemplary embodiment of a fuse apparatus/assembly/device (hereinafter, "device") 100 in accordance with the present disclosure is shown. As shown, the device 100 may include a socket body 102 enclosed by a cap or housing 104. Together, the housing 104 and socket body 102 define an internal cavity 106, which houses and encloses a fusible element 108 wound about a central shaft 110. In some embodiments, the fusible element 108 may be a wire, and the central shaft 110 may be an insulated core. The winding of the fusible element 108 about the central shaft 110 forms a plurality of interstices between the respective windings. The frequency of the windings and consequently the number of interstices therebetween may vary depending on the desired rating of the fuse. Furthermore, a thickness of the fusible element 108 may vary depending on the application.

A set of leads 109A and 109B extend through openings in the socket body 102 and are electrically connected with the fusible element 108. The upper ends of the leads 109A, 109B may include, for example, clips that retain ends of the fusible element 108 in contact with respective ends of the leads. Although not shown, solder portions may be used to connect the upper ends of the leads 109A, 109B to the fusible element 108. The fusible element 108 and the central shaft 110 are shown as being configured in a perpendicular relationship to a longitudinal axis of each of the set of leads 109A and 109B. When an occurrence of a specified overcurrent or surge current condition occurs, the fusible element 108 melts or otherwise opens to interrupt the circuit path and isolate the protected electrical components or circuit from damage. In the embodiment shown, no arc quenching material is present in the central cavity 106. However, in other embodiments, an arc quenching material may also be included within the housing 104 to absorb the effects of the arc which occurs when the fusible element 108 melts after, for example, an over-current condition.

As shown, the socket body 102 may include a first side 111 opposite a second side 112, a third side 113 opposite a fourth side 114, and a fifth side 115 opposite a sixth side 116. In some embodiments, a set of ribs or protrusions 122 may extend from one or more of the sides, e.g., the fifth side 115 and the sixth side 116 for engagement with the housing 104. It will be appreciated that the socket body 102 and/or the housing 104 may be formed of plastic or electrically insulating material capable of withstanding heat generated when the fusible element 108 is blown. In some embodiments, the housing 104 may be a Durethan resin.

Figure 2:
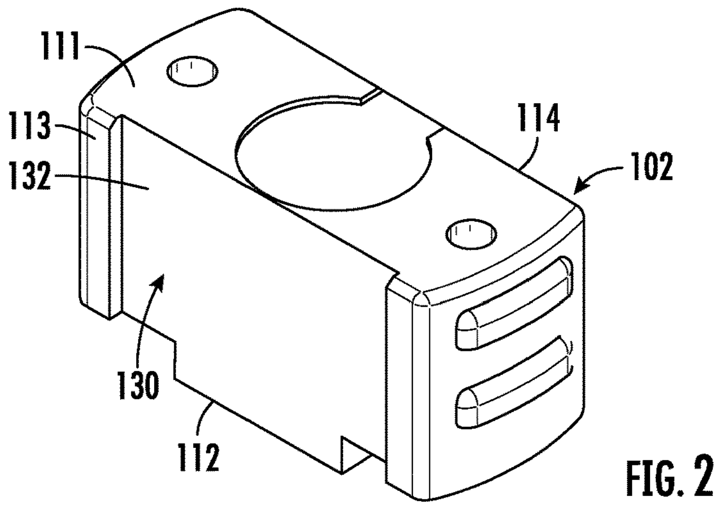
FIGS. 2-4 are perspective views of various socket bodies of the protection device according exemplary embodiments of the present disclosure.

As shown in FIG. 2, the socket body 102 may further include a thermal vent 130 along one or more sides thereof. Although not shown, when the housing 104 is secured over the socket body 102, an interior surface of the housing 104 may further define one portion of the thermal vent 130. In this embodiment, the thermal vent 130 may be recessed into the third side 113, and may have a planar or flat surface 132. As shown, the thermal vent 130 may extend entirely between the first side 111 and the second side 112 to provide enhanced cooling to the device 100. In other embodiments, a second thermal vent may also be recessed into the fourth side 114.

Figure 3:
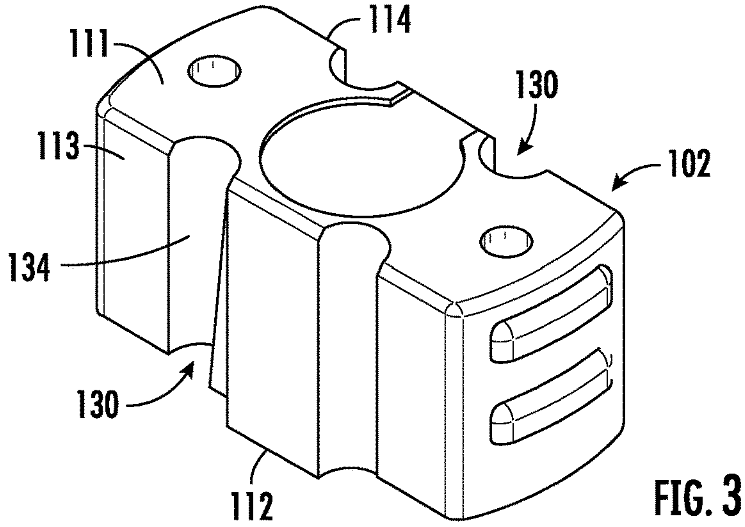

In another embodiment, as shown in FIG. 3, the socket body 102 may further include a plurality of thermal vents 130 along the third side 113, and a plurality of thermal vents 130 along the fourth side 114. As shown, each of the thermal vents 130 may be recessed into the socket body 102, and may have a curved or semi-circular profile defined by surface 134. As shown, the thermal vents 130 may extend entirely between the first side 111 and the second side 112 to provide enhanced cooling to the device 100. In other embodiments, three or more thermal vents may be present on each of the third side 113 and the fourth side 114. Embodiments herein are not limited in this context, however.

Figure 4:
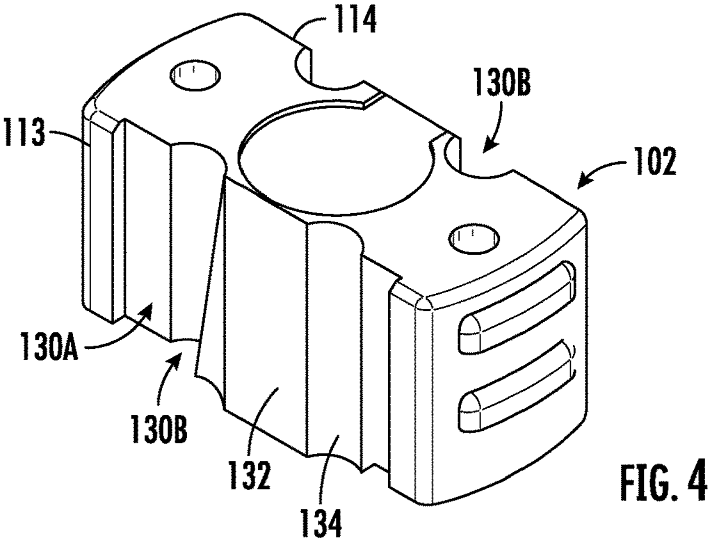

In yet another embodiment, as shown in FIG. 4, the socket body 102 may include a main thermal vent 130A and a plurality of additional thermal vents 130B along the third side 113, and a plurality of additional thermal vents 130B along the fourth side 114. As shown, the main thermal vent 130A may be recessed into the third side 113, and may have one or more planar or flat surfaces 132. As also shown, each of the additional thermal vents 130B may be further recessed into the socket body 102, and may have a curved or semi-circular profile defined by surface 134. The main thermal vent 130A and the additional thermal vents 130B may extend entirely between the first side 111 and the second side 112 of the socket body 102 to provide enhanced cooling to the device 100.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A protection device, comprising:

a set of leads extending though a socket body, wherein the socket body comprises:

a first side opposite a second side; and a third side opposite a fourth side, wherein the third and fourth sides extend between the first and second sides, wherein the third side includes a thermal vent, wherein the thermal vent comprises a first flat surface and a second flat surface recessed into the socket body, towards the fourth side, a first curved surface extending from the first flat surface, a second curved surface extending from the second flat surface, wherein the first and second curved surfaces are i-s-recessed farther into the socket body than the first and second flat surfaces, wherein the first and second curved surfaces are connected by a third flat surface, wherein the third flat surface is parallel to the first and second flat surfaces, and wherein the first and second flat surfaces are recessed farther into the socket body than the third flat surface; and a fusible element surrounding a central shaft, wherein the fusible element is connected with the set of leads.

2. The protection device of claim 1, further comprising a housing partially enclosing the socket body.

3. The protection device of claim 2, wherein the housing defines an internal cavity, and wherein no arc suppression material is present within the internal cavity.

4. The protection device of claim 2, wherein an interior surface of the housing further defines the thermal vent.

5. The protection device of claim 2, wherein the socket body comprises a set of ribs operable to engage the housing.

6. The protection device of claim 5, wherein the socket body further comprises a fifth side opposite a sixth side, and wherein the set of ribs extends from the fifth side.

7. The protection device of claim 1, wherein the fusible element is a wire wound helically about the central shaft.

8. The protection device of claim 1, further comprising a second thermal vent recessed into the fourth side of the socket body.

9. The protection device of claim 1, wherein the central shaft is an insulated core.

10. A fusible device, comprising:

a set of leads extending though a socket body, wherein the socket body comprises:

a first side opposite a second side; and a third side opposite a fourth side, wherein the third and fourth sides extend between the first and second sides, wherein at least one of the third side and the fourth side includes a thermal vent, wherein the thermal vent comprises a first flat surface and a second flat surface recessed into the socket body, towards the fourth side, and a first curved surface extending from the first flat surface, a second curved surface extending from the second flat surface, and wherein the first and second curved surfaces are is recessed farther into the socket body than the first and second flat surfaces, wherein the first and second curved surfaces are connected by a third flat surface, wherein the third flat surface is parallel to the first and second flat surfaces, and wherein the first and second flat surfaces are recessed farther into the socket body than the third flat surface; and a fusible element wound about a central shaft, wherein the fusible element is electrically connected with the set of leads.

11. The fusible device of claim 10, further comprising a housing partially enclosing the socket body, wherein the leads extend outside of the housing.

12. The fusible device of claim 11, wherein the housing defines an internal cavity, wherein no arc suppression material is present within the internal cavity, and wherein an interior surface of the housing further defines the thermal vent.

13. The fusible device of claim 11, wherein the socket body further comprises a fifth side opposite a sixth side, and wherein a set of ribs extends from the fifth side for engagement with the housing.

14. The fusible device of claim 10, wherein the fusible element is a wire wound helically about the central shaft, and wherein the central shaft is an insulated core.

15. The fusible device of claim 10, further comprising a second thermal vent recessed into the third side or the fourth side of the socket body.

16. A circuit protection device, comprising:

a set of leads extending though a socket body, wherein the socket body comprises:

a first side opposite a second side; and a third side opposite a fourth side, wherein the third and fourth sides extend between the first and second sides, and wherein at least one of the third side and the fourth side includes a thermal vent, wherein the thermal vent comprises a first flat surface and a second flat surface recessed into the socket body, towards the fourth side, and a first curved surface extending from the first flat surface, a second curved surface extending from the second flat surface, and wherein the first and second curved surfaces are is recessed farther into the socket body than the first and second flat surfaces, wherein the first and second curved surfaces are connected by a third flat surface, wherein the third flat surface is parallel to the first and second flat surfaces, and wherein the first and second flat surfaces are recessed farther into the socket body than the third flat surface;

a fusible element wound about a central shaft, wherein the fusible element is electrically connected with the set of leads; and a housing surrounding the socket body, wherein the housing defines an internal cavity enclosing the fusible element.

17. The circuit protection device of claim 16, wherein an interior surface of the housing further defines the thermal vent.

18. The circuit protection device of claim 16, wherein the socket body further comprises a fifth side opposite a sixth side, and wherein a set of ribs extends from the fifth side for engagement with the housing.

19. The circuit protection device of claim 16, wherein the fusible element is a wire wound helically about the central shaft, and wherein the central shaft is an insulated core.

20. The circuit protection device of claim 16, further comprising a second thermal vent recessed into the third side or the fourth side of the socket body, wherein the second thermal vent extends between the first and second sides of the socket body.

* * * * *